United States Patent [19]

Pettinaroli

[11] Patent Number: 4,848,724
[45] Date of Patent: Jul. 18, 1989

[54] BALL VALVE WITH HANDLE LOCKING MECHANISM

[75] Inventor: Giuseppe Pettinaroli, Novara, Italy

[73] Assignee: Fratelli Pettinaroli S.p.A., S. Maurizio D'Opaglio, Italy

[21] Appl. No.: 227,155

[22] Filed: Aug. 2, 1988

[30] Foreign Application Priority Data

Feb. 3, 1988 [IT] Italy ............... 19291 A/88

[51] Int. Cl.[4] ............................................. F16K 35/06
[52] U.S. Cl. ........................................ 251/95; 137/385;
251/104; 251/110; 251/288; 251/316; 70/177;
70/180
[58] Field of Search ............... 137/384.2, 384.4, 384.8,
137/385; 70/175, 176, 177, 180; 251/95, 96, 98,
99, 102, 104, 105, 106, 110, 297, 315, 316, 286,
287, 288

[56] References Cited

U.S. PATENT DOCUMENTS

| | | | |
|---|---|---|---|
| 576,956 | 2/1897 | Doyle | 70/176 |
| 664,462 | 12/1900 | Campbell | 137/385 |
| 932,188 | 8/1909 | Strelezky | 251/99 |
| 983,842 | 2/1911 | Schneible | 137/385 |
| 1,495,403 | 5/1924 | Davis | 137/385 |
| 1,759,433 | 5/1930 | Carmosin | 251/96 |
| 2,512,320 | 6/1950 | Fischer | 251/95 |
| 2,678,186 | 5/1954 | Blackford | 251/105 |
| 3,858,843 | 1/1975 | Hartmann | 251/99 |
| 4,577,831 | 5/1986 | DiBartolo | 251/95 |

FOREIGN PATENT DOCUMENTS

| | | | |
|---|---|---|---|
| 148161 | 12/1936 | Fed. Rep. of Germany | 251/96 |
| 0013365 | of 1911 | United Kingdom | 251/96 |
| 407064 | 3/1934 | United Kingdom | 251/98 |
| 527132 | 10/1940 | United Kingdom | 251/96 |

Primary Examiner—George L. Walton
Attorney, Agent, or Firm—Young & Thompson

[57] ABSTRACT

A ball valve of the type comprising a body including a valve chamber having inlet and outlet ports, and a rotatable ball element disposed within the valve chamber, the ball defining a conduit communicating with the inlet and outlet ports. The ball is actuated by a control lever to rotate between a first open position and a second closed position of the valve; a manually operable lock is provided to retain the control lever and the ball element in those first and second positions and in at least one intermediate operative position.

3 Claims, 3 Drawing Sheets

BALL VALVE WITH HANDLE LOCKING MECHANISM

BACKGROUND OF THE INVENTION

The present invention relates in general to ball valves, and in particular to a cut-off valve having locking means operatively connected to the ball element to prevent rotation, keeping the ball element in one or more preset operative conditions between the maximum open and closed condition of the valve.

Ball valves are commonly used to provide efficient and extremely reliable means to cut-off the flow of a fluid, which may operate quickly even at high pressures.

However, a problem arising in commonly used ball valves is the difficulty of "choking" that is to open or close partially the valve locking the closing or ball member in a preset working condition, avoiding accidental or intentional operations which can change the present operative condition of the valve. This disadvantage is particularly felt in those applications for which the passage of fluid must be maintained at a preset value, and accidental or deliberate manipulations of the valve, such as could alter or modify the operative conditions downstream which in certain working conditions might be undesirable or dangerous, must be prevented.

SUMMARY OF THE INVENTION

According to the present invention there is provided a ball valve comprising a body including a valve chamber, inlet and outlet ports communicating with said valve chamber, a rotatable ball element disposed within the valve chamber, said ball element including wall means defining a conduit, a control lever to rotate said ball element between a first or open position in which said conduit communicates with the fluid inlet and outlet ports, and a second or closed position in which said conduit of the ball element is disposed in a transverse position to said ports, annular sealing members being arranged between the ball element and the inlet and outlet ports of the valve chamber, said control lever being connected to the end of a rotatable shaft of the ball element, and a downwardly depending lip at the end of said lever engaging stop protrusions on the valve body in said open and closed positions of the ball element, the improvement including manually operable locking means to lock the ball member in the open and closed positions and in at least one intermediate operative position to reduce the flow, said locking means comprising a sliding ring-shaped element operatively connected to rotate with the control lever, said ring element comprising a downwardly depending cylindrical wall portion having a toothed edge engaging and disengaging one of said protrusions on the valve body, and retaining means to retain said ring element in an engaged condition with said protrusion.

Preferably the ring element of said locking means is slidingly supported by a bush member freely rotating and coaxialy arranged to the ball shaft, the device further comprising shoulder means to prevent the unthreading of said ring element and bush member.

The ball valve according to the invention provides a quick cut-off means which may be placed and maintained in a stable way in a locked condition which can be modified only by a deliberated intervention of an operator.

BRIEF DESCRIPTION OF THE DRAWINGS

A preferential embodiment of a ball valve according to the present invention is described below, referring to the attached drawings.

DESCRIPTION OF THE INVENTION

Figure 1:
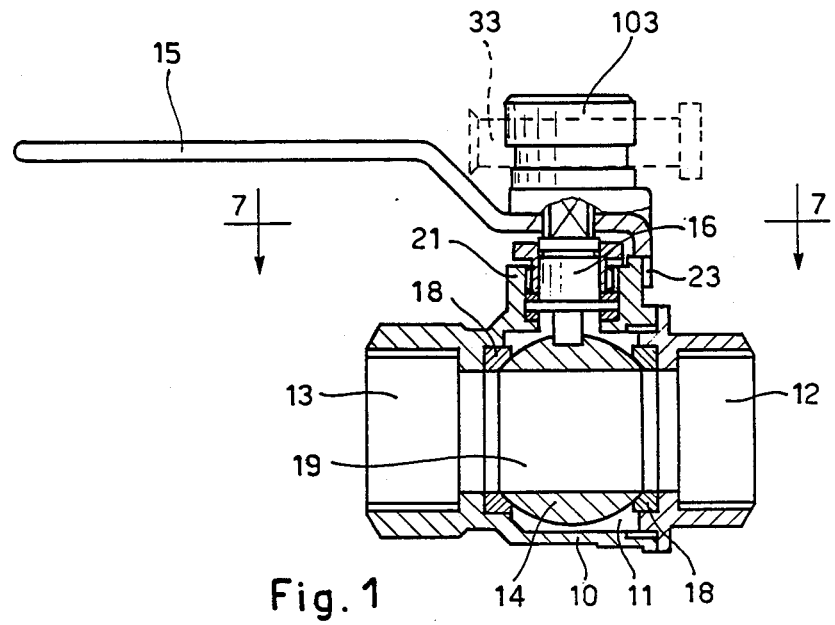
FIG. 1 is a longitudinal sectional view of the ball valve in fully open condition.

The ball valve comprises a body 10 which, in this specific case, consists of two halves screwed together; the valve body 10 includes an intermediate portion defining an inner valve chamber 11 and end portions axially aligned defining inlet and outlet ports 12 and 13 communicating with the valve chamber 11.

A rotatable ball or closing element 14, is disposed inside the chamber 11 of the body 10 of the valve; the ball 14 can be rotated by means of a control lever 15 connected to a shaft 16 of the ball element, rotatably supported by a hub 21. The shaft 16, at its lower end is seated in a groove on the outer surface of ball element 14, while the upper end 17 is suitably shaped and received in a slot-shaped hole near the forward end of the control lever 15.

Figure 4:
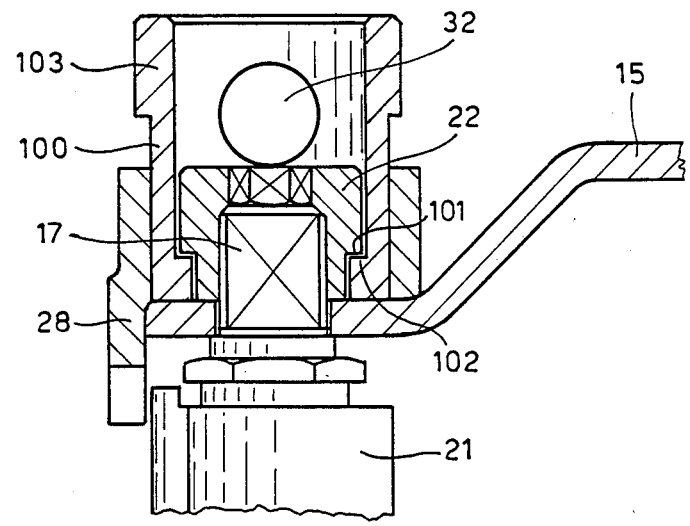
FIG. 4 is an enlarged sectional view of the upper part of the ball valve of FIG. 1.
Figure 5:
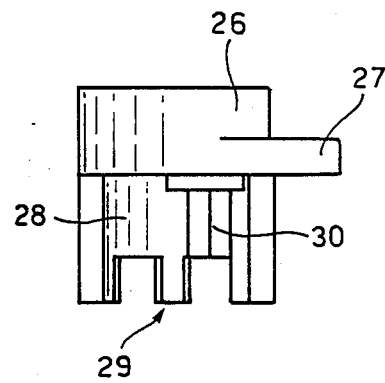
FIG. 5 is a view from a side of the toothed locking member.
Figure 6:
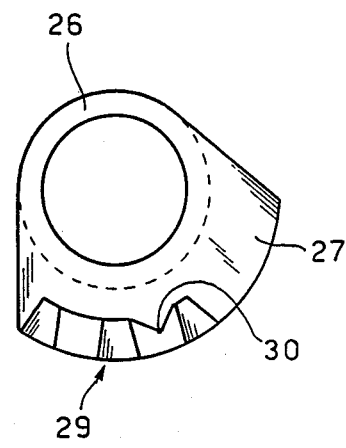
FIG. 6 is a view from below of the locking member of FIG. 5.
Figure 7:
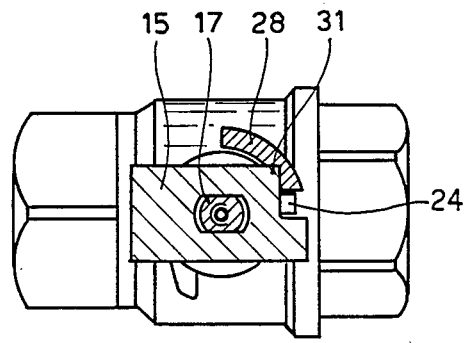
FIG. 7 is a sectional view along line 7—7 of FIG. 1.

Ball 14 includes wall means defining a transverse conduit 19 which, in the open condition of the valve, shown in FIG. 1, is arranged coaxially and in communication with inlet and outlet ports 12 and 13. The rotation of the ball 14 for an angle of 90° around the axis of shaft 16, brings the ball 14 into a second closed condition of the valve in which the flow is completely cutoff. Annular sealing members 18 are disposed between ball 14 and inlet and outlet ports 12 and 13, inside the valve chamber 11, and further sealing rings are disposed between the ball shaft 16 and the hub 21. The control lever 15 is secured to the upper end 17 of shaft 16 by a nut 22 which is screwed onto the threaded end 17, as shown in the section of FIG. 4. The nut 22 has a cylindrical lower portion and an upper enlarged portion defining an annular shoulder 101.

A bush or cylindrical element 100, is located coaxially to nut 22 to freely rotate, and is prevented from axial movement by an inner annular shoulder 102 abutting against the shoulder 101 of nut 22. The upper end of cylindrical element 100 comprises an upper enlarged portion 103, of greater diameter, defining with the lower cylindrical portion an outer annular shoulder.

Figure 2:
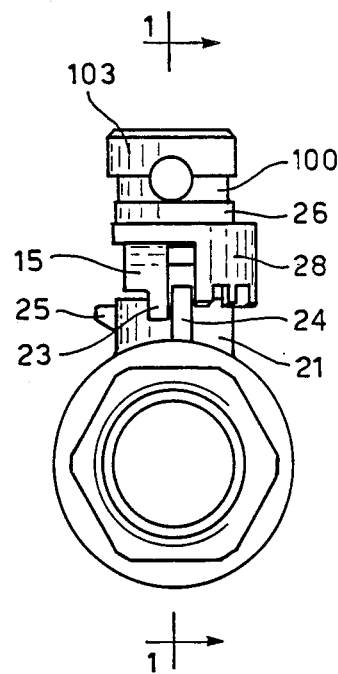
FIG. 2 is a front view of the ball valve of FIG. 1.

As shown in FIG. 1 and 2, the forward end of control lever 15 is downwardly bent and provided with a downwardly protruding lip 23 so as to approach the outer cylindrical surface of the hub portion 21 of the valve body; turning the lever 15, the lip 23 engages stop protrusions 24 and 25, on the hub 21, in such a way as to define two main operative open and closed positions of the valve.

As previously mentioned, the valve includes means to lock ball 14 in the open and closed position, as well as in one or more intermediate operative positions in which the flow of fluid is proportionally reduced.

The ball locking means prevent or permit rotation of control lever 15, engaging and disengaging the protrusion 24 on the body of the valve 10 relative to said first operative position in which the ball valve is totally open. As shown, said means include a ring-shaped element 26 freely sliding and rotating on the bush 100 in the direction and around the axis of rotation of ball 14. The ring-shaped element 26 has a radial wall portion 27 along a preset angle, having downwardly turned cylindrical wall 28 concentric to the outer cylindrical surface of the hub 21. The lower edge of the cylindrical wall 28 is toothed at 29, and the sides of contiguous teeth are parallely arranged to each other and spaced apart by a distance corresponding to the thickness of protrusion 24 so that the latter can be engaged and disengaged by sliding and turning movements of the ring element 26, as shown in FIGS. 1 and 3.

The locking ring element 26 is connected to lever 15 to rotate with it in such a way as to maintain the same angular relation with respect to the lever 15 while allowing a sliding movement of ring 26.

For this purpose the inner surface of cylindrical wall portion 28 of the locking ring element 21 has a longitudinal slot 30 into which protrude a corner or protruding portion 31 at the front edge of lever 15, which fits in such a way as to allow locking ring element 26 to rotate with lever 15 and to slide axially along cylindrical bush 100 at the same time, while maintaining its angular positio with reference to the control lever. The position of slot 30 and the angular width of the cylindrical wall portion 28 must be such as to allow protrusion 24 to be between the last tooth 29 of wall 28 and lip 23 of the control lever when the valve is in the open position, as shown in FIG. 1, and also such that when the valve is in the closed position the last tooth at the other edge of the wall 28 abuts against the protrusion 24, thus preventing rotation in either direction of lever 15 which therefore remains locked in the desired condition.

Figure 3:
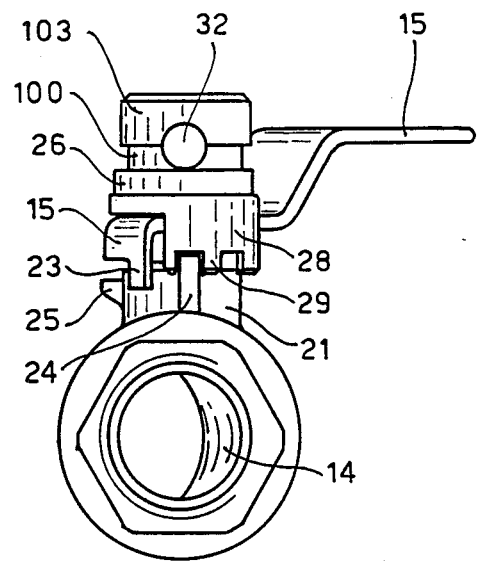
FIG. 3 is a view similar to FIG. 2, but with the ball element of the valve locked in an intermediate or partially open position.

The slots between teeth 29 thus define intermediate positions for partial opening of the valve, such as that shown in FIG. 3, between conditions of maximum opening and fully closed as described above.

To ensure that locking ring element 26, does not accidentally disengage from protrusion 24, or be deliberately disengaged to operate the valve, thus modifying or altering the flow conditions, a supplementary retaining means has been provided to ensure that the locking element 26 is not moved backwards or raised, and disengaged from protrusion 24 which stops rotation of the control lever. This supplemental stop or retaining device comprises diametrally opposed holes 32 in the upper portion of bush 100 near its enlarged portion 103, through which a stop pin 33 is inserted; the ends of the pin 33 can be suitably deformed, i.e. widened, or provided with enlarged portions to prevent withdrawal. Any other equivalent means can be used instead of pin 33, e.g. a padlock, so as to ensure that locking element 26 will not move backwards or be deliberately disengaged from protrusion 24.

The use of the ball valve and the operation of the locking device are as follows: after having established the working condition of the valve, i.e. the position which ball 14 must assume and maintain unchanged, the locking ring element 26 is raised or moved backwards against the upper shoulder surface 103 of the bush 100, disengaging toothing 29 from the protrusion 24. In these condition the control lever 15 may be freely rotated to move the ball element 14 into the desired angular position; during rotation the locking element 26 maintains its position relative to lever 15 insofar as corner portion 31 at the end of the lever 15 always remains in longitudinal slot 30 on the inner side of cylindrical wall 28 of the above mentioned locking ring device.

Once control lever 15, and therefore ball 14 are in the desired operative position, the locking element 26 is lowered to engage its teeth 29 with protrusion 24. Pin 33, or some other equivalent retaining means is inserted into holes 32 of bush 100 and securely fastened, thus ensuring that locking element 26 cannot be moved backwards by accident or deliberately. The ball valve is thus permanently locked in the desired operative condition.

If it is necessary to free the ball valve to modify or vary its operative condition, the above procedure must be reversed, i.e. pin 33 must be removed, locking element 26 must be raised or back-moved against the shoulder of upper portion 103 of bush 100 so as to disengage toothing 29 from protrusion 24; it is now possible to rotate lever 15 to the new operative position. Once lever 15 and therefore valve ball 14 are in the new desired position locking element 26 is once again lowered or moved forward to engage protrusion 24 as described above, and a new pin 33 is inserted.

The above description, and the attached drawings, describe a ball valve according to the present invention, provided with a ball locking device of extremely simple construction and secure in operation, by which it is possible to lock the valve ball in preset operating positions, ensuring that the valve cannot be tampered with. It is to be understood that the above description and the attached drawings have been provided only as an example of the claimed invention.

What is claimed is:

1. In a ball valve comprising a body including a valve chamber, inlet and outlet ports communicating with said valve chamber, a rotatable ball element disposed within the valve chamber, said ball element including wall means defining a conduit, a control lever to rotate said ball element between a first or open position in which said conduit communicates with the fluid inlet and outlet ports, and a second or closed position in which said conduit in the ball element is disposed in a transverse position to said ports, annular sealing members arranged between the ball element and the inlet and outlet ports of the valve chamber, said control lever being connected to the end of a rotatable shaft of the ball element, and a downwardly depending lip at the end of said lever engaging stop protrusions on the valve body in said open and closed position of the ball element; the improvement including manually operable locking means to lock the ball element in the open and closed positions, and in at least one intermediate operative position to reduce the flow, said locking means comprising a sliding ring element operatively connected to rotate with the control lever and supported thereon, said ring element comprising a downwardly depending cylindrical wall portion having a toothed edge engaging and disengaging one of said protrusions of the valve body for selection of one of said ball element positions by slidably moving said locking ring element, and retaining means to retain said ring element in an engaged condition with said stop protrusion, said retaining means for the locking ring element comprising a nut member screwed on the shaft of the ball element, said nut member having an enlarged annular shoulder, a freely rotating bush member disposed within said locking ring element around said nut member, said ring member being slidably and rotatably movable on said bush member, said bush member having an inner shoulder at its lower end to engage said shoulder of the nut member, and holes means at the upper end of said bush member for the insertion of a retaining member preventing the sliding movement of the locking ring element.

2. A ball valve as in claim 1, wherein the inner surface of the cylindrical wall portion of the locking ring element comprises a longitudinal slot, and a protrusion on the control lever slidingly engaging said longitudinal slot.

3. A ball valve as claimed in claim 1, in which the bush member comprises an upper enlarged portion defining an annular shoulder surface for abutting said locking ring element to serve as a stop for limiting upward movement of said bush member relative to said locking ring element.

* * * * *